United States Patent [19]

Fehr

[11] Patent Number: 4,476,773
[45] Date of Patent: Oct. 16, 1984

[54] AIR DIFFUSER ASSEMBLY

[75] Inventor: Werner Fehr, Steinheim, Fed. Rep. of Germany

[73] Assignee: Sueddeutsche Kuehlerfabrik Julius Fr. Behr GmbH, Stuttgart, Fed. Rep. of Germany

[21] Appl. No.: 437,358

[22] Filed: Oct. 28, 1982

[30] Foreign Application Priority Data

Nov. 12, 1981 [DE] Fed. Rep. of Germany ....... 3144899

[51] Int. Cl.³ .............................................. B60H 1/14
[52] U.S. Cl. ................................ 98/2.08; 137/625.47;
251/134; 415/206
[58] Field of Search .................... 137/625.47; 415/206;
251/134; 165/126; 98/2.08, 39

[56] References Cited

U.S. PATENT DOCUMENTS 480,929  8/1892  Lansing ............................... 415/166
4,252,502  2/1981  Scheidel ............................. 415/206

FOREIGN PATENT DOCUMENTS 57-209414  12/1982  Japan ..................................... 98/2.08

Primary Examiner—William E. Wayner
Assistant Examiner—J. Sollecito
Attorney, Agent, or Firm—Schwartz, Jeffery, Schwaab, Mack, Blumenthal & Koch

[57] ABSTRACT

Disclosed is an improved diffuser assembly for use in ventilating, heating and air conditioning installations where it is necessary to conduct the air flow of a blower through air discharge fittings to air outlet nozzles such as those in the passenger compartment of an automobile. The air diffuser according to the present invention is of simple configuration, inexpensive to produce and requires only a small amount of space for installation. The diffuser has a cylindrical housing, with an intake fitting positioned on one frontal side and a plurality of air discharge orifices located successively with respect to each other along a circumferential surface of the cylindrical housing. Air discharge fittings are adapted to be attached to the discharge orifices. Coaxially positioned in the housing a rotating drum is provided. The drum is provided on its jacketing surface with openings whereby, depending on the angular position of the drum with respect to the housing, the orifices of the housing may be selectively opened or closed by the openings. Within the drum a coaxial radial blower wheel is provided.

14 Claims, 3 Drawing Figures

AIR DIFFUSER ASSEMBLY

FIELD OF THE INVENTION

The present invention relates to air diffusers and more particularly to air diffusers for combined heating, ventilating and air conditioning installations such as those commonly utilized in automotive vehicles.

BACKGROUND OF THE INVENTION

Combination heating, ventilating and air conditioning installations, such as that disclosed in DE-OS 24 45 590, are well known. Such installations typically comprise a housing and a blower for forcing air through and out of the housing. Downstream of the blower with regard to the direction of air flow there may be positioned an evaporator for air conditioning and a heater core. Several air outlet fittings are usually provided, each of which leads to an opening in the passenger compartment of the automobile. Control of the flow of air through the individual outlets is usually effected by pivoting baffles or the like. Such baffles are commonly regulated by means of a vacuum control element which, as the result of the restricted space available in passenger cars, must be positioned so that complex transmissions and lever translations are required. Such arrangements are very expensive because of the large number of individual parts and moreover are difficult to manufacture and install since they require the accurate alignment of baffles and associated adjusting mechanisms. A further disadvantage of baffle controlled air outlet openings is that, in vehicles having high air flow requirements, in order to maintain the desired level of heating and ventilation comfort, a large number of baffles and vacuum control elements must be provided.

Baffles actuated by means of vacuum control elements have an additional disadvantage in that most are generally either open or closed and cannot be opened into intermediate positions. While some vacuum controlled baffles may be brought into one intermediate position, they require the use of additional expensive control elements. In either case, the setting of an arbitrary number of intermediate baffle positions is not possible with the use of the vacuum control elements. Moreover, the known configurations require a considerable amount of valuable under-dashboard space, inasmuch as two heat exchangers, a blower and a plurality of closing and reversing baffles are all arranged in a common housing.

SUMMARY AND OBJECTS OF THE INVENTION

It is therefore an object of the present invention to provide a compact air diffuser assembly which is of simple configuration and inexpensive to produce and which only requires a small structural space.

It is a further object of the present invention to provide an air diffuser assembly which permits individual regulation of various air outlets and which permits a large number of intermediate air baffle positions.

It is a still further object of the present invention to provide an air diffuser assembly which supplies a uniform air temperature flow to various air outlet openings.

In accordance with the present invention, an air diffuser assembly, particularly suitable for a heating, ventilating and air conditioning installation for automotive vehicles, is provided having a blower with at least one intake orifice and a plurality of air discharge orifices opening into discharge fittings. The air discharge orifices may be moved selectively or in combination into open or closed positions. The air diffuser preferably has a generally cylindrical housing with the intake orifice preferably positioned on one frontal surface and the plurality of discharge openings preferably spaced along a circumferential surface of the housing. The air discharge fittings direct the discharge air to various discharge openings, such as a floor vent. A drum is rotatingly supported in the housing, and is equipped, preferably on its "jacketing" surface, with openings corresponding to the discharge orifices. Therefore, depending on the relative angular position between the drum and the housing, various drum openings may be moved selectively and progressively into or out of registration with the discharge orifices, thus opening and closing the orifices. A radial blower wheel is arranged inside the drum to provide the necessary forced air movement. The type of radial blower is of no significance for the nature of this application (e.g. U.S. Pat. No. 3,744,204).

Preferably, the drum is equipped with a gear rim, which is engaged by a drive pinion of a servomotor to drive the drum. Since no mechanical connection to an actuating lever on the instrument panel is necessary, the invention makes it possible to install the air diffuser at any location desired in a vehicle.

In addition, a transducer is preferably provided for the detection of the prevailing angular position of the drum. The transducer may preferably be in the form of a position potentiometer actuated by means of a pinion engaging the gear rim of the drum. Depending on the angular position of the drum, the resistance of the position potentiometer varies and its output voltage can be used as reference value for the control of the servomotor. In order to adapt the control range of the invention to the actual needs inside an automotive vehicle, while maintaining the configuration of the housing and the drum as simple as possible, a particularly advantageous arrangement of the invention consists of positioning the orifices over approximately one-half of the circumference of the diffuser housing and providing the drum with three corresponding openings, the size of which correspond to the cross section of the discharge orifices. In the advantageous embodiment, two of the drum openings are located successively adjacent to each other along the circumferential direction of the drum and the third opening is offset by 180° with respect to one of the two drum openings. As the result of this arrangement, the drum is capable of occupying six principal positions in which one or two of the discharge orifices are completely open, and a plurality of intermediate positions in which the orifices are only partially open.

Preferably, the air intake opening has a fitting arranged coaxially with the housing and the drum is equipped with a corresponding flange with an external diameter corresponding to the internal diameter of the intake fitting. This provides the drum with an additional support in the housing, which counteracts any tendency of the coaxial drum to become misaligned. The servomotor for the drum and the transducer are preferably located on an outer side of a frontal wall of the housing opposite the air intake opening and the pinions are fastened to axles protruding through that frontal wall. The intake fitting is preferably connected to a housing in which an evaporator and a heater body are located, so that refrigerated or heated air may be supplied as needed.

If, on the circumference of the housing, three discharge orifices are provided, one of the discharge orifices is preferably connected to a duct fitting leading to a nozzle positioned in the legroom space of an associated automobile. A second orifice is preferably connected to a fitting leading to a defrost nozzle, and third discharge orifice is preferably connected to a fitting leading to an air outlet nozzle in the center section of the passenger compartment of the associated automobile. In order to obtain air flow rates of different magnitude without significant additional circuitry, the radial blower may be equipped with suitable designed blades, producing differential air flow outputs depending on the direction of rotation. The fact that the radial blower is placed directly in front of the air outlet orifices effects a good intermixing of the air suctioned in. The introduction into the passenger compartment of air at different temperatures through the individual air outlet openings is thus prevented.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

An exemplary embodiment of an air diffuser according to the present invention shall be described in more detail hereinafter with the aid of the accompanying drawings which are incorporated in and which form a part of the specification, and which, together with the description, serve to explain the principles of the invention.

In the drawings.

DETAILED DESCRIPTION OF PREFERRED EMBODIMENTS

Figure 1:
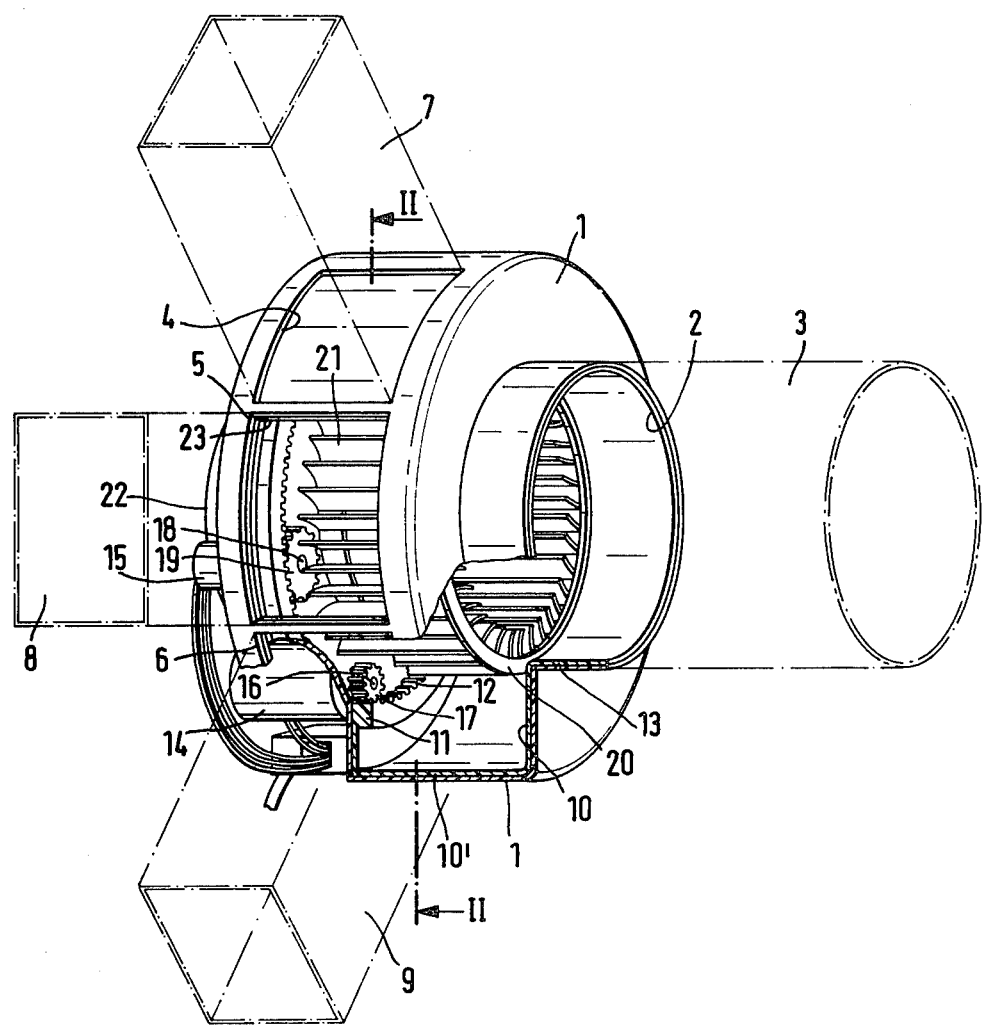
FIG. 1 is a perspective, partially sectioned view of an air diffuser assembly in accordance with the present invention.

Reference will now be made in detail to the present preferred embodiment of the invention, an example of which is illustrated in the accompanying drawings. Turning first to FIG. 1 there is illustrated an air distribution housing 1 having essentially a cylindrical configuration. The air distribution housing 1 has a lateral axial center orifice 2, to which an air intake fitting 3 is joined. Three discharge orifices, 4, 5 and 6, are located on the jacketing surface of the cylindrical air distribution housing 1, to which the discharge fittings 7, 8 and 9 are connected. Each of these fittings functions to service different aspects of the air supply system for an automobile. For example, the discharge fitting 7 may lead to defroster nozzles, the discharge fitting 8 may lead to air outlet nozzles in the center section of the passenger compartment and the discharge fitting 9 may lead to air outlets in the leg space.

Positioned in the air distribution housing 1 is a drum 10, accurately adapted to the configuration of the housing 1. The drum is adapted to be in a rotating relationship with the housing. The drum 10 has a collar 11 with gear rim 12 on its internal radius. The drum 10 also has a flange 13 protruding into the intake fitting 3, whereby the drum 10 is provided with additional support to maintain its coaxial position in the housing 1. On frontal wall 14 of the air distribution housing 1, adjacent to the gear rim 12 of the drum 10, a servomotor 14 and a transducer 15 (for example a position potentiometer) are fastened. Preferably, these components are arranged so that the axle 16 of the electric servomotor 14 protrudes through the frontal wall 14 of the air distribution housing 1. The axle 16 carries a drive pinion 17, the teeth of which engage the gear rim 12. The axle 18 of the transducer 15 may also protrude through the frontal wall of the air distribution housing 1, and carries a pinion 19, the teeth of which also engage the gear rim 12.

Inside the drum, rotatable blower wheel 20 of a radial fan configuration is provided. The blower wheel 20 is equipped with a plurality of generally arcuate blades 21. The blower wheel 20 may be driven by an electric motor 22 or the like which is appropriately arranged on the frontal side 1' opposite to inlet opening 2.

In the preferred embodiment, the drum 10 has in its jacket part 10' three spaced apart openings (all numbered 23) corresponding dimensionally to the orifices 4, 5 and 6. To effect the distribution of air, the drum 10 is rotated inside the air distribution housing 1, whereby the three openings 23 in the jacket part 10' are rotated with respect to the discharge orifices 4, 5 and 6. The openings 23 are therefore operable to selectively close or open the discharge orifices 4, 5 and 6, to thereby direct the flow of air to the various individual discharge openings and their associated fittings.

The rotation of the drum 10 is effected by the servomotor 14, which drives the drum 10 through the drive pinion 17. The corresponding angle of rotation of the drum 10 is detected by the transducer 15, which is connected by means of the pinion 19 with the gear rim 12. The transducer is operable to generate a suitable signal to input to the control circuit S (FIG. 3), when the desired position is attained.

It will be appreciated by the artisan that it is also possible to extend or to position the discharge orifices 4, 5 and 6 into the areas of either frontal surface of the housing adjacent to the jacket surface of the drum 10 and to then adapt the opening 23 of the drum 10 to correspond accordingly.

Figure 2:
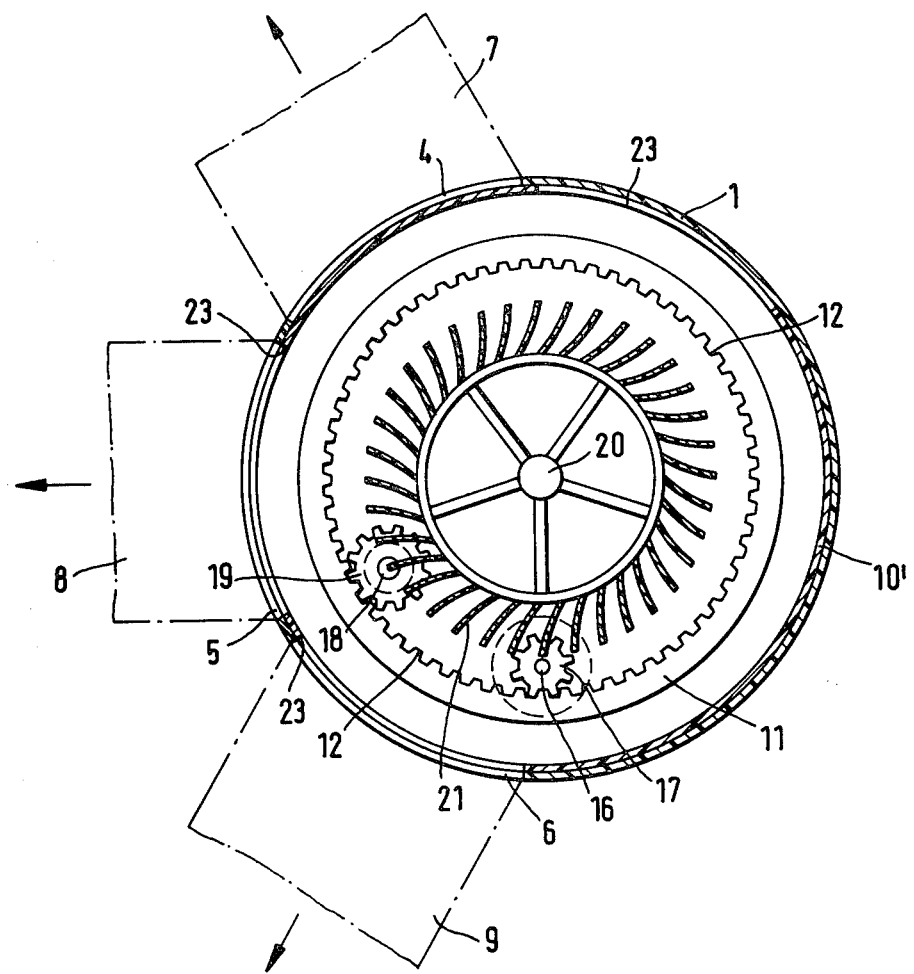
FIG. 2 is a cross-sectional view along the line II—II of the assembly of FIG. 1.

FIG. 2 shows the air diffuser assembly housing according to a section taken across section lines II—II of FIG. 1. Similar parts are identified with similar indicia in FIGS. 1 and 2. As seen in FIG. 2, the three discharge orifices 4, 5 and 6 are preferably arranged along the circumferential surface of the housing 1 and are preferably distributed over an angle of approximately 180°. As mentioned above, the drum 10 has three openings 23, which dimensionally correspond to the discharge orifices 4, 5 and 6 in the air distribution housing 1. Two of the openings 23 in the drum 10 are positioned successively adjacent to each other and the third opening 23 is positioned to be offset by 180° with respect to one of the above-noted two openings 23. In the position of the drum 10 indicated in FIG. 2 the exit of the air into the fittings 8 and 9 is unobstructed. The openings 23 in the drum 10 are chosen so that in each case a rotation of the drum through an angle of approximately 60° is required to attain the next position. This yields six principal positions uniformly distributed over the circumference. These positions are listed hereinbelow, together with an indication of the respective air discharge fitting(s) opened in each position:

| Angle of rotation of drum | Air discharge fitting(s) open |
| --- | --- |
| 0° | 8 + 9 |
| 60° | 8 + 7 |
| 120° | 7 |
| 180° | 9 |
| 240° | 8 |
| 300° | 7 + 9 |

In the example above, the principal positions are defined so that air flows to only one of the fittings 7, 8 or 9, or to only two of the fittings, in any arbitrary combination. Obviously, a plurality of intermediate positions, wherein the discharge orifices 4, 5 and 6 are only partially open, may also be occupied.

The blades 21 of the radial fan 20 are preferably designed so that different volumes of air are moved depending on the direction of rotation of the radial fan 20. This obviates the need for complicated blower control circuitry.

Figure 3:
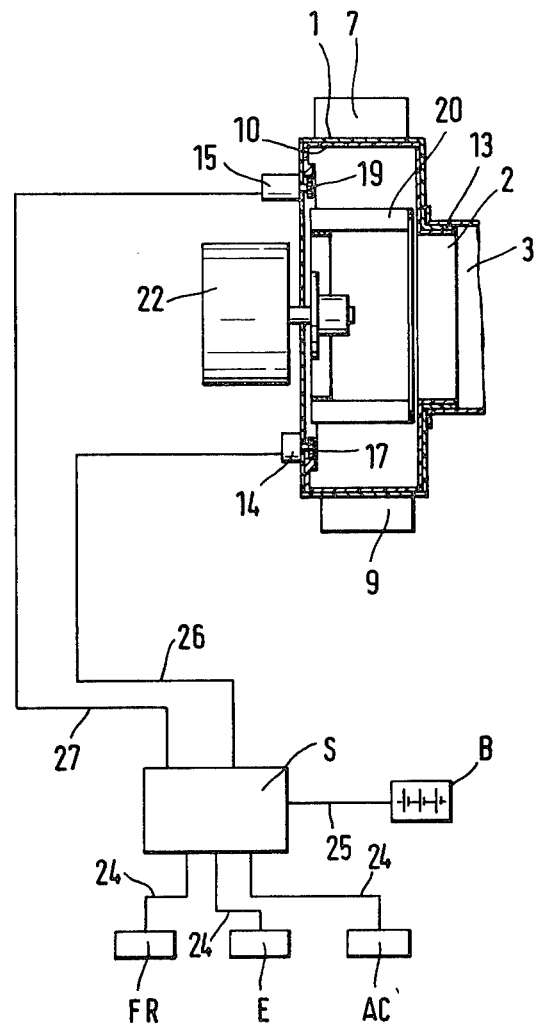
FIG. 3 is a schematic view of the air diffuser assembly, illustrating the actuation device.

Turning now to FIG. 3, an air diffuser assembly according to the invention is shown schematically, together with a device for its actuation. Parts identified in FIG. 1 and 2 are designated by similar reference symbols in FIG. 3. The actuating device essentially consists of a control unit S, connected through line 25 with a source B of electric power. Three selection keys, FR, E and AC are provided. The keys are connected by control lines 24 with the control unit S. The servomotor 14 is connected by means of line 26 to the control unit S and the transducer 15 is connected by means of a line 27 with the control unit S.

The operation of the embodiment of FIG. 3 will now be described. When the selection key FR is actuated, if the drum 10 is not in the desired position, the servomotor 14 will rotate the drum 10 until it occupies the position in which only the discharge orifice 6 is open, thereby directing the entire air volume moved through the duct 9 and into the leg room. This corresponds to the 180° position in the table hereinabove. If the selection key E is actuated, the drum 10, by operation of the servomotor 14, will rotate until it occupies the 120° position thereby opening only the discharge orifice 4. The actuation of selection key AC moves the drum into the 240° position thereby opening the discharge orifice 5. A position potentiometer in the transducer 15 varies its resistance according to the rotation of the pinion 19. The prevailing value of the resistance is detected in the control unit S. If the resistance value detected does not correspond to the angular position of the drum 10 in accordance with the value entered by the keys FR, E and AC, the control unit S actuates the servomotor 14 until the resistance value of the transducer 15 corresponds to the value entered.

Appropriate servomechanism drive circuits are well known in the art and can be found in *Principles of Control Systems Engineering* by del Toro and Parker, McGraw-Hill, 1960. An air diffuser assembly constructed in accordance with the invention saves space and may, therefore, be adapted to conform with the limited space available for such assemblies in the automotive vehicle. The assembly size varies directly as a function of the size of the blower wheel required. In case individual settings of the air discharge nozzles on the driver and the passenger sides of the automobile are desired, two air distributors may be provided, which in view of the space saving configuration according to the invention may be readily accomplished.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the size, position and shape of the drum and housing orifices may be varied to suit the particular application. While a radial fan blower wheel is preferred fr compactness, other blowers may obviously be used. The position detection transducer may obviously be embodied by sensors other than a drive pinion operated potentiometer. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A compact air diffuser assembly, comprising:
   (a) a generally cylindrical housing comprising first and second generally planar end surfaces, an intermediate circumferential surface, three air discharge orifices positioned sequentially about a periphery of said housing, and an air intake orifice generally positioned on the first planar end surface coaxially with the cylindrical housing, wherein the discharge orifices are arranged along approximately one-half of the circumference of the housing;
   (b) a blower comprising a radial blower wheel positioned within the housing and operable to force air through the housing; and
   (c) a rotatably supported drum coaxially positioned within and movable relative to the housing, comprising three openings, wherein the openings are positioned about circumferential surface of the drum to selectively engage with the discharge orifices depending upon the angular position of the drum, wherein the dimensions of the openings correspond to the dimensions of the discharge orifices, and wherein two of the drum openings are located directly adjacent to each other along the circumferential surface, whereas the third drum opening is offset by approximately 180° with respect to one of the other two openings.

2. The air diffuser assembly according to claim 1, wherein the drum is operable to move into six principal positions wherein either one or two of the discharge orifices are completely open and into a plurality of intermediate positions wherein the discharge orifices are only partially opened.

3. The air diffuser assembly according to claim 1, wherein the intake opening has a fitting arranged coaxially with the housing and the drum has a cylindrical flange arranged coaxially with the housing, and wherein the drum flange has an external diameter which corresponds to the internal diameter of the intake fitting.

4. The air diffuser assembly according to claim 3, wherein the intake opening is connected to a housing containing at least one evaporator and a heater core, whereby the intake air may be refrigerated or heated.

5. The air diffuser assembly according to claim 1, wherein one of said discharge orifices has an associated discharge fitting adapted to lead to a leg room nozzle, and a second of said discharge orifices has an associated discharge fitting adapted to lead to a defroster nozzle, and a third of said discharge orifices has an associated discharge fitting adapted to lead to an air discharge nozzle in a center section of an automobile passenger compartment.

6. The air diffuser assembly according to claim 1, wherein the radial blower wheel comprises a plurality of blades positioned along the periphery of the wheel, said blades having a configuration whereby, depending on the direction of rotation of the radial blower wheel, different volumes of air are moved.

7. The air diffuser assembly according to claim 1, wherein the drum is equipped with gear rim, which is engaged by a drive pinion of a servomotor to drive the drum.

8. The air diffuser assembly according to claim 7, wherein the drive pinion is mounted on an axle protruding through said second generally planar surface.

9. The air diffuser assembly according to claim 7, wherein a transducer is provided for detecting the prevailing angular position of the drum.

10. The air diffuser assembly according to claim 9, wherein the transducer is a position potentiometer actuated by means of pinion engaging the gear rim.

11. The air diffuser assembly according to claim 10, wherein the potentiometer pinion is mounted on an axle protruding through said second generally planar surface of the housing.

12. A compact air diffuser assembly for use with an automotive ventilation system, comprising:
   (a) a generally cylindrical housing comprising first and second generally planar end surfaces, an intermediate circumferential surface, three air discharge orifices positioned sequentially about a periphery of said housing, and an air intake orifice generally positioned on the first planar end surface coaxially with the cylindrical housing, wherein the discharge orifices are arranged along approximately one-half of the circumference of the housing; and wherein said air intake orifice is provided with a fitting for directing air from a heater core or an evaporator into the housing;
   (b) a blower comprising a radial blower wheel positioned within the housing and operable to force air through the housing; and
   (c) a rotatably supported drum coaxially positioned within and movable relative to the housing, comprising three openings, wherein the openings are positioned about circumferential surface of the drum to selectively engage with the discharge orifices depending upon the angular position of the drum, the dimensions of the openings correspond to the dimensions of the discharge orifices, and wherein two of the drum openings are located directly adjacent to each other along the circumferential surface, whereas the third drum opening is offset by approximately 180° with respect to one of the other two openings.

13. A compact air diffuser assembly comprising a housing having an air intake orifice therein, a blower positioned in said housing and operable to force air through the housing, a plurality of air discharge orifices positioned sequentially about a periphery of said housing, a jacket, movably supported by said housing and having therein a plurality of openings of a size generally corresponding to said discharge orifices, said jacket being movable relative to said housing and said jacket openings being arranged to selectively register with said discharge orifices to open and close said orifices whereby air may be selectively discharged through one or more of said discharge orifices, wherein said blower comprises a radial blower wheel, wherein said housing is generally cylindrical and comprises first and second generally planar surfaces and an intermediate circumferential surface and said air intake orifice is generally positioned on said first planar surface and along the axis of said cylinder and coaxially with said blower wheel, wherein said discharge orifices are positioned along a circumferential surface of said housing, wherein said jacket comprises a drum positioned coaxially within said housing and supported to rotate about said axis to various positions and wherein said openings are positioned about a circumferential surface of said drum to selectively register with said discharge orifices depending upon the angular position of said drum, wherein the drum is equipped with a gear rim, which is engaged by a drive pinion of a servomotor to drive the drum, wherein a transducer is provided for detecting the prevailing angular position of the drum, and wherein the transducer comprises a position potentiometer actuated by means of a pinion engaging the gear rim.

14. An air diffuser assembly according to claim 13, wherein the potentiometer pinion is mounted on an axle protruding through said second generally planar surface of the housing.

* * * * *